June 24, 1930.    B. E. GOBLE    1,767,282
PUMPING POWER
Filed April 16, 1928
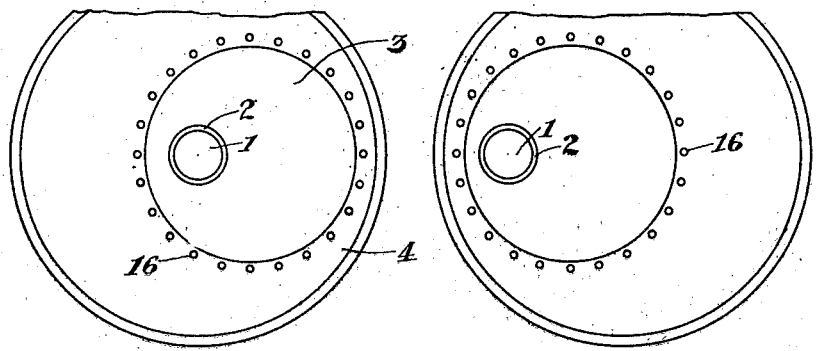
Fig-1-     Fig-2-
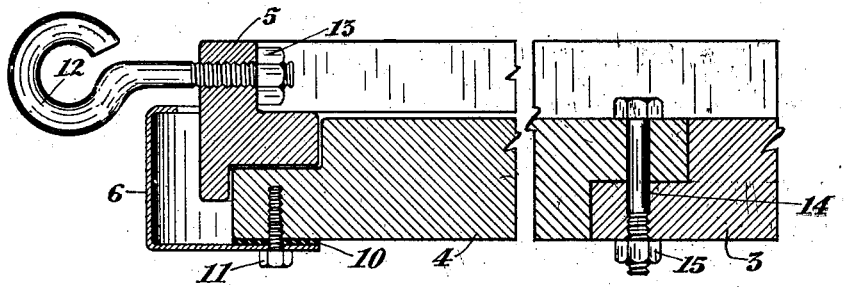
Fig-3-
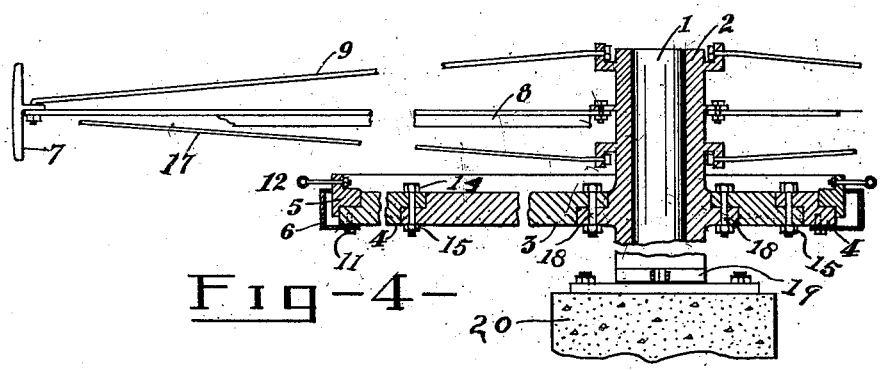
Fig-4-
INVENTOR
Bert G. Goble Patented June 24, 1930

1,767,282

UNITED STATES PATENT OFFICE

BERT G. GOBLE, OF TULSA, OKLAHOMA, ASSIGNOR TO W. A. QUIGLEY

PUMPING POWER

Application filed April 16, 1928. Serial No. 270,371.

This invention relates to an improved central power to be used principally for pumping oil wells where a central power plant is used to pump a number of wells on shackle lines running out in different directions from said power plant.

One object of this invention is to provide a power plant in which the distance that the shackle lines travel horizontally backward and forward to the several wells may be adjusted to long or short strokes as desired.

Another object of my invention is to provide a bath of oil for the main bearing or eccentric to run in, so that it is always running in oil, and assuring plenty of lubrication and lessening the wear and friction, at the same time requiring less power. This bath of oil extends above the contacting surfaces thereby giving pressure lubrication.

Another object of the invention is to provide a power plant that is suitable to use when the wells pump several hundred barrels of fluid, when they need to be pumped with a long stroke and make an easy way to adjust the stroke and make it shorter on the pumping jacks as the wells decline in production and a less stroke is required.

Another important object of this invention is to provide a central power plant for pumping oil wells in which the shackle line stroke can be adjusted from a stroke as short as will ever be desired during the life of the wells, and as long a stroke as desired during the time that the wells are flush and producing lots of oil. It has been an old custom not to put wells pumping on central powers until the wells produce only a small amount of oil, as the operator would not want to put a power plant in with a stroke long enough on the shackle line to handle the wells, as it would be entirely too long a stroke for the many years. The power would be used after the wells have produced their flush production. This is the advantage of my adjustable stroke power, as the stroke can easily be adjusted an inch at a time as the wells get smaller and it is desired to have a shorter stroke.

Another improvement on this power is to provide a power plant so constructed that the shackle line can be adjusted to any stroke desired without installing any new parts and in which the adjustment can be made by simply taking out a number of bolts and sliding the outside eccentric around to the desired place and again rebolting in the same holes. This can be arranged so that the adjustment can be made an inch at a time if desired, and the stroke on the shackle lines can range any where from nothing to any length stroke desired on the same set of parts. This is accomplished simply by shifting the outside eccentric on the inside eccentric. By using the two eccentrics any desired stroke may be obtained.

Another advantage of this invention is that two or more sets of eccentrics may be used on the same power plant, and different length strokes may be obtained at the same time to accommodate wells that require hard pumping and also those that need less pumping.

Still a further advantage of my invention is the adjustable stroke to make a power in which the stroke can be adjusted on the different wells so that they may not be pumped too hard or too little where wells are being pumped steady, that the jacks may set so that no wells are pumped too much. Where they are not pumped steady, the stroke can be adjusted on different jacks so that the different wells may be pumped off at about the same time.

One of the important advantages of my invention is that with the easy adjustable arrangement of the stroke my power gives it will be practical to install a central power much earlier than with the ordinary power, and make a big saving to the operator.

With the above and numerous objects in view, as will appear as description proceeds, the invention resides in certain novel features of construction and in the combination and arrangement of parts, as will hereafter more fully be described and claimed.

Figure 1 is a top view of my eccentric put together so that there would be no stroke on the shackle line, as the shaft is centered with outer edge of the eccentric.

Figure 2 is a top view of same eccentric as shown in Figure 1, but set to give the maximum throw or stroke on the shackle line.

Figure 3 is a sectional view showing how the two eccentric rings in Figures 1 and 2 are adjustably held together by bolts, and how the shackle line support rim runs in a bath of oil.

Figure 4 is a part sectional view of the usual band wheel that turns the hub and eccentric, such giving the rim that the shackle lines are attached to the horizontal movement that is carried to the different jacks at the wells.

Figure 1 shows a top view of the shaft 1, hub 2, inner ring 3, and outer ring 4. The way eccentric 4 is set on inner ring 3 it does not give the shackle lines any stroke, and this view is not practical, but simply used to illustrate the possibilities of using two adjustable accentrics.

Figure 2 shows a top view as Figure 1, except that the outer ring 4 is just turned half way around on 3 and gives the maximum stroke on the shackle line. Now to get half the stroke on the shackle lines shown in Figure 2, just turn the outer ring 4 one-quarter around on 3. If desired to shorten stroke one-twelfth on Figure 2, just turn the outer ring 4 one hole on the inner ring 3, and so on, to get any length stroke desired. The holes, 16, are spaced the same distance apart on both 3 and 4 and can be spaced closer together for finer adjustment of stroke on shackle line if desired.

Figure 3 is a sectional view showing the outside portion of inner ring 3 and part of the outer ring 4, and how 3 and 4 are adjustably held together as one eccentric by means of bolts 14 and nuts 15. It also shows how the oil pan 6 is held securely to the outer ring 4 by means of bolts 11, and oil is kept from leaking out of the pan by use of the pad 10. 5 indicates the shackle line support which has a bearing on the outer ring 4 and the bearing surfaces of 4 and 5 run in a bath of oil,—5 may be held on 4 in any desired manner. 12 shows the shackle hook and 13 shows means for holding 12 to rim 5.

In Figure 4 the shaft 1 is shown, 2 shows the hub, 9 and 17 show adjustable spokes which hold the rim of the band wheel 7, the angle 8 is a stiff brace for the band wheel. Bolts 18 hold the inside ring 3 to the hub 2. Bolts 14 hold outer ring 4 secure to 3. Bolts 11 hold the oil pan 6 secure to the outer ring 4, and 5 indicates the shackle line support which runs in a bath of oil. 12 shows the shackle line attachment, 19 shows bearing plate, and 20 indicates the usual foundation.

From the above description it will be apparent that I have provided a pumping power that has been long desired, a power with an adjustable stroke on the shackle lines. The adjustment can be made without furnishing any new parts and gives the oil operator the advantage of having as long a stroke on the shackle lines as desired when the wells are flush and pumping lots of oil, and adjusting the stroke down as the wells decline,—and giving a suitable power the full life of the wells, which has heretofore been considered impossible.

What I claim and desire to secure by Letters Patent is:

1. A double eccentric consisting of a hub having an outwardly extending flange, an inner ring having an inwardly extending flange bolted to said former flange and also having an outwardly extending portion, an outer ring having an inwardly extending portion overlapping the former portion and means circumposed about the outer periphery of the outer ring.

2. An adjustable eccentric comprised of a hub having an outwardly extending flange, an inner ring having a flange riding on said outwardly extending flange, an outer ring having a flange riding on said inner ring, rim means encircling said outer ring, means for holding the inner and the outer rings together, and means for holding the inner ring and the hub flange together.

3. An adjustable eccentric consisting of a hub having a seat therein, an inner eccentric ring having a circular projection snugly riding in said seat, said inner ring having a groove or seat along its outer edge, an outer ring having a circular projection fitting in said groove or seat, said outer ring having a groove along its outer periphery and circular means sliding therein.

4. An adjustable eccentric comprised of a vertical hub, an inner ring having a circular series of holes along its outer edge, means for fastening the inner ring to the hub, an outer ring having a groove along its outer edge and a series of holes along its inner edge in alignment with said first mentioned holes, means in said holes for holding the outer ring upon the inner ring, a rim mounted in said groove and circular means bolted to said outer ring and extending outwardly and upwardly and then inwardly to a point adjacent the rim whereby an oil chamber is formed.

In testimony whereof I affix my signature.

BERT G. GOBLE.